(12) United States Patent
Takahashi et al.

(10) Patent No.: US 11,731,631 B2
(45) Date of Patent: Aug. 22, 2023

(54) VEHICLE MOVEMENT CONTROL DEVICE, METHOD, PROGRAM, AND SYSTEM, AND TARGET TRAJECTORY GENERATING DEVICE, METHOD, PROGRAM, AND SYSTEM

(71) Applicant: Hitachi Automotive Systems, Ltd., Hitachinaka (JP)

(72) Inventors: Junya Takahashi, Tokyo (JP); Kenta Maeda, Tokyo (JP); Masamichi Imamura, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 632 days.

(21) Appl. No.: 16/757,507

(22) PCT Filed: Oct. 9, 2018

(86) PCT No.: PCT/JP2018/037602
§ 371 (c)(1),
(2) Date: Apr. 20, 2020

(87) PCT Pub. No.: WO2019/093046
PCT Pub. Date: May 16, 2019

(65) Prior Publication Data
US 2021/0362720 A1    Nov. 25, 2021

(30) Foreign Application Priority Data
Nov. 9, 2017 (JP) .................. 2017-216646

(51) Int. Cl.
*B60W 30/18* (2012.01)

(52) U.S. Cl.
CPC ... *B60W 30/18163* (2013.01); *B60W 2520/10* (2013.01); *B60W 2520/12* (2013.01); *B60W 2720/125* (2013.01)

(58) Field of Classification Search
CPC ....... B60W 30/18163; B60W 2520/10; B60W 2520/12; B60W 2720/125; B62D 15/0255; G08G 1/167
See application file for complete search history.

(56) References Cited

U.S. PATENT DOCUMENTS 4,679,809 A * 7/1987 Ito .................. B62D 7/159
180/408
10,800,451 B2 * 10/2020 Mizoguchi ............ B60W 30/14
(Continued)

FOREIGN PATENT DOCUMENTS

FR    3121411 A1 * 10/2022
JP    1-141174 A    6/1989
(Continued)

OTHER PUBLICATIONS

Japanese-language Office Action issued in Japanese Application No. 2017-216646 dated Aug. 31, 2021 with English translation (9 pages).

(Continued)

*Primary Examiner* — Angelina Shudy
(74) *Attorney, Agent, or Firm* — Crowell & Moring LLP (57) ABSTRACT

Provided are a vehicle motion control device, a method thereof, a program thereof, a system thereof in which it is adapted for traveling situation while an occurrence of an unstable behavior of a vehicle at the time of automatic lane change is suppressed, and a target trajectory generation device, a method thereof, a method thereof, a program thereof, and a system thereof. In a vehicle that can automatically control a lateral acceleration generated in the vehicle at the time of lane change, the lateral acceleration at the time of lane change is controlled such that an absolute value of a maximum lateral acceleration generated on a lateral acceleration generation phase (the secondary steering side) in a lateral direction opposite to the moving direction (Continued)

at the time of lane change is equal or more than an absolute value of a maximum lateral acceleration generated on a lateral acceleration generation phase (primary steering side) in the same direction as a lateral moving direction at the time of lane change.

13 Claims, 7 Drawing Sheets

(56) References Cited

U.S. PATENT DOCUMENTS

| | | | |
|---|---|---|---|
| 10,953,882 B2* | 3/2021 | Fujii | B62D 15/0255 |
| 11,092,967 B2* | 8/2021 | Akiyama | B62D 6/003 |
| 11,427,247 B2* | 8/2022 | Kuwabara | G05D 1/021 |
| 2005/0240334 A1 | 10/2005 | Matsumoto et al. | |
| 2007/0282510 A1* | 12/2007 | Nimmo | B60T 8/246 |
| | | | 701/1 |
| 2009/0192675 A1 | 7/2009 | Yamakado et al. | |
| 2010/0082195 A1* | 4/2010 | Lee | B62D 15/0255 |
| | | | 701/25 |
| 2012/0053791 A1* | 3/2012 | Harada | B60T 8/4031 |
| | | | 701/38 |
| 2012/0283912 A1* | 11/2012 | Lee | B62D 1/286 |
| | | | 701/41 |
| 2015/0094927 A1* | 4/2015 | Takahashi | B60W 30/143 |
| | | | 701/93 |
| 2015/0232088 A1* | 8/2015 | Tagesson | B60W 10/184 |
| | | | 701/41 |
| 2015/0239442 A1* | 8/2015 | Yamakado | B60W 10/08 |
| | | | 701/70 |
| 2015/0367844 A1* | 12/2015 | Tagesson | B60W 10/20 |
| | | | 701/41 |
| 2017/0248959 A1* | 8/2017 | Matsubara | B60W 30/00 |
| 2017/0261989 A1 | 9/2017 | Ishioka et al. | |
| 2017/0305416 A1* | 10/2017 | Yamakado | B60T 7/12 |
| 2017/0334446 A1* | 11/2017 | Bosch | B60W 50/10 |
| 2018/0072325 A1* | 3/2018 | Koike | B60W 50/085 |
| 2018/0281787 A1 | 10/2018 | Shiota et al. | |
| 2018/0281857 A1* | 10/2018 | Choi | B60W 10/20 |
| 2018/0297638 A1* | 10/2018 | Fujii | B60W 30/18163 |
| 2018/0346019 A1* | 12/2018 | Fujii | B62D 1/286 |
| 2018/0346026 A1* | 12/2018 | Fujii | B62D 15/025 |
| 2019/0061766 A1* | 2/2019 | Nishiguchi | B60W 10/06 |
| 2019/0080609 A1* | 3/2019 | Mizoguchi | G08G 1/166 |
| 2020/0290677 A1* | 9/2020 | Fujii | G05D 1/0257 |
| 2020/0307685 A1* | 10/2020 | Akiyama | G05D 1/0246 |
| 2020/0406969 A1* | 12/2020 | Ersal | B60W 10/184 |
| 2021/0061271 A1* | 3/2021 | Omikawa | B62D 15/025 |
| 2021/0171042 A1* | 6/2021 | Hayakawa | G08G 1/167 |
| 2021/0197822 A1* | 7/2021 | Jhang | B60W 30/0953 |
| 2021/0362720 A1* | 11/2021 | Takahashi | B60W 10/20 |
| 2022/0016998 A1* | 1/2022 | Kusayanagi | B60N 2/10 |
| 2022/0041161 A1* | 2/2022 | Belle | B60W 30/146 |
| 2022/0073098 A1* | 3/2022 | D'Orazio | B60W 50/14 |
| 2022/0185278 A1* | 6/2022 | Satoh | G06V 20/593 |

FOREIGN PATENT DOCUMENTS

| | | | | |
|---|---|---|---|---|
| JP | 2008-285066 A | | 11/2008 | |
| JP | 2012-236512 A | | 12/2012 | |
| JP | 2012236512 A | * | 12/2012 | |
| JP | 2013-148948 A | | 8/2013 | |
| JP | 2015-58890 A | | 3/2015 | |
| JP | 2016141264 A | * | 8/2016 | ............ B60W 10/06 |
| JP | 2017-56779 A | | 3/2017 | |
| JP | 2017-074806 A | | 4/2017 | |
| JP | 2017-87899 A | | 5/2017 | |
| JP | 2017100534 A | * | 6/2017 | ............ B60W 10/20 |
| JP | 2017-165156 A | | 9/2017 | |
| JP | 2020117040 A | * | 8/2020 | |
| JP | 6763344 B2 | * | 9/2020 | ......... B62D 15/0255 |
| WO | WO 2016/110732 A1 | | 7/2016 | |

OTHER PUBLICATIONS

International Search Report (PCT/ISA/210) issued in PCT Application No. PCT/JP2018/037602 dated Dec. 4, 2018 with English translation (six (6) pages).

Japanese-language Written Opinion (PCT/ISA/237) issued in PCT Application No. PCT/JP2018/037602 dated Dec. 4, 2018 (five (5) pages).

Supplementary Partial European Search Report issued in European Application No. 18877166.1 dated Oct. 1, 2021 (thirteen pages).

* cited by examiner

VEHICLE MOVEMENT CONTROL DEVICE, METHOD, PROGRAM, AND SYSTEM, AND TARGET TRAJECTORY GENERATING DEVICE, METHOD, PROGRAM, AND SYSTEM

TECHNICAL FIELD

The present invention relates to a vehicle motion control device for controlling traveling of a vehicle such as an automobile, a method thereof, a program thereof, and a system thereof, and a target trajectory generation device for generating a target trajectory on which the vehicle travels, a method thereof, a program thereof, and a system thereof.

BACKGROUND ART

In recent years, the development of ADAS (advanced driving assistance system) and autonomous driving-related technology in automobiles has been rapidly advanced. As functions for automating part of the driving operation, an adaptive cruise control, a lane keeping assist system, an emergency automatic braking, and the like have been commercialized. In addition, with the increase in automation, an automatic lane change system to an adjacent lane has been proposed.

As a technique for the above-described automatic lane change system, for example, PTL 1 discloses a detection device that detects a position of a lane marking of an adjacent lane based on an image captured by a camera.

Further, for example, in PTL 2, as a method of suppressing steering control involving sudden steering at the time of lane change, a method for deforming the actual traveling trajectory is disclosed in which, when a maximum lateral acceleration is larger than a predetermined reference lateral acceleration, the maximum lateral acceleration becomes smaller than the reference lateral acceleration.

Although it is not directly related to the above-described automatic lane change system, as a control technology that relates acceleration and deceleration of a vehicle to lateral motion in automatic driving or the like along a road shape, PTL 3 proposes a control method of acceleration/deceleration based on a lateral acceleration increasing rate (a temporal change or a changing rate of the lateral acceleration) generated by steering.

CITATION LIST

Patent Literature

PTL 1: JP 2013-148948 A
PTL 2: JP 2017-56779 A
PTL 3: JP 2008-285066 A

SUMMARY OF INVENTION

Technical Problem

However, even under a condition that is equal to or less than a predetermined reference lateral acceleration as described in PTL 2, the lateral acceleration that can be generated in the vehicle differs depending on the road surface condition, the vehicle, and the like, and a behavior may be disturbed by the lateral acceleration generated in the lateral acceleration generation phase in the same direction as the lateral moving direction at the time of lane change. Further, if the reference lateral acceleration is set to an excessively small value in order to avoid this problem, it is necessary to secure a wide traveling region required for lane change, and there may be cases where lane change cannot be performed frequently.

The invention has been made in view of the above circumstances, and an object of the invention is to provide a vehicle motion control device, a method thereof, a program thereof, a system thereof in which it is adapted for traveling situation while an occurrence of an unstable behavior of a vehicle at the time of automatic lane change is suppressed, and a target trajectory generation device, a method thereof, a method thereof, a program thereof, and a system thereof.

Solution to Problem

In order to solve the above-described problems, a vehicle motion control device or the like according to the invention can automatically control a lateral acceleration generated in a vehicle at the time of lane change. When a phase in which the lateral acceleration in the same direction as a lateral moving direction at the time of lane change is defined as a primary steering side of lane change, and a phase in which the lateral acceleration in a direction opposite to the lateral moving direction at the time of lane change is defined as a secondary steering side of lane change, a lateral motion of the vehicle is controlled such that an absolute value of a maximum lateral acceleration generated at the time of a secondary steering of lane change becomes equal to or greater than an absolute value of a maximum lateral acceleration generated at the time of a primary steering of lane change.

In addition, a target trajectory at the time of lane change is generated so that a maximum curvature value of a traveling trajectory during a secondary steering of lane change becomes equal to or greater than a maximum curvature value of a traveling trajectory during a primary steering of lane change.

Advantageous Effects of Invention

According to the invention, for example, the turning limit can be estimated based on the turning responsiveness of the vehicle during the primary steering while the lateral acceleration generated on the primary steering side is suppressed. By generating the lateral acceleration on the secondary steering side within the turning limit range, it is possible to change lanes without excessively suppressing the lateral acceleration while disturbance of the vehicle behavior on the primary steering side is suppressed. The effect of improving the occupant's comfort can be expected.

Objects, configurations, and effects besides the above description will be apparent through the explanation on the following embodiments.

DESCRIPTION OF EMBODIMENTS

Hereinafter, embodiments of the invention will be described with reference to the accompanying drawings.

Outline of Embodiment

Prior to the description of a specific embodiment, first, a lateral acceleration in lane change will be described with reference to FIGS. 1 to 3 so that the invention is easily understood. In this example, in a case where a gravity center point of a vehicle is set to an original point, a front-rear direction of the vehicle is set to x, and a direction perpendicular to the longitudinal direction (the lateral (right and left) direction of the vehicle) is set to y, the acceleration in the x direction is a longitudinal acceleration, and the acceleration in the y direction is a lateral acceleration. In addition, the forward acceleration is positive, that is, the longitudinal acceleration which increases the speed when the vehicle is proceeding in the forward direction is positive. In addition, the lateral acceleration which is generated when the vehicle is proceeding in the forward direction and turns left (counterclockwise) is positive, and is negative in the opposite direction. In addition, a left-turning radius is set to be positive, and the reciprocal number thereof is set to a vehicle running curvature. Similarly, a target trajectory also has a left-turning radius as positive, and the reciprocal number thereof is set to a target trajectory curvature. In addition, a steering angle in the left turning (counterclockwise) direction is set as positive.

Figure 1:
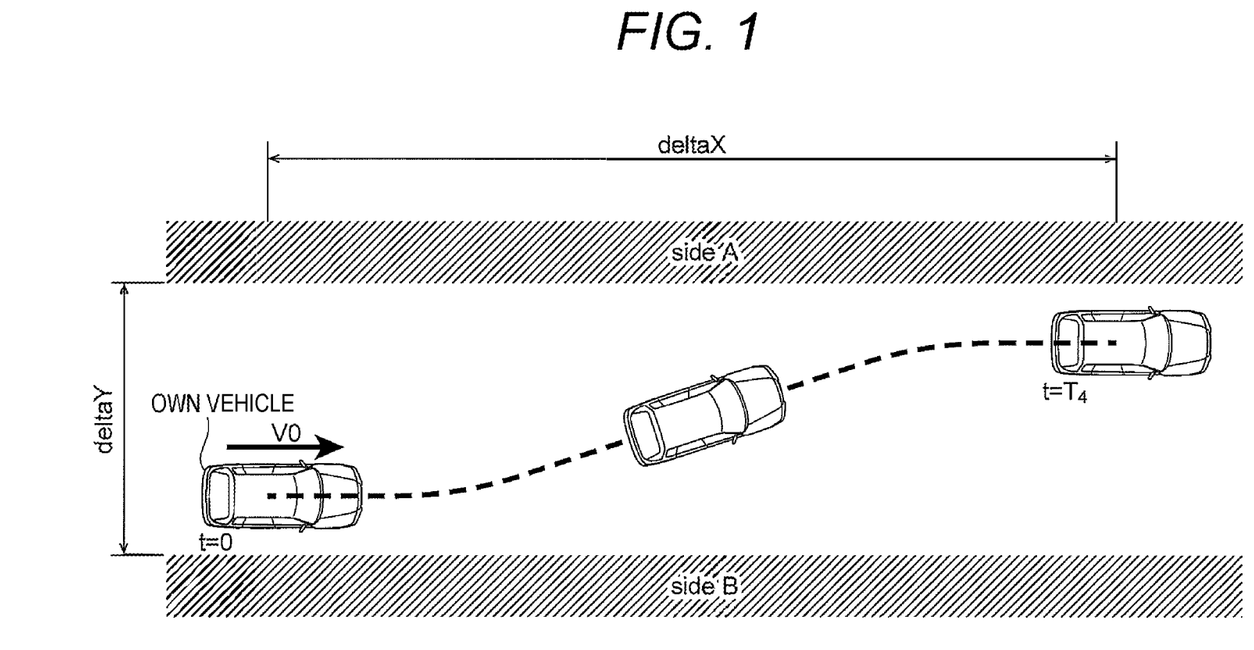
FIG. 1 is a conceptual diagram of lane change.

FIG. 1 is a conceptual diagram of a vehicle that starts the lane change at time t=0 from an initial speed V0 until the distance (a distance in the front-rear direction) deltaX within the distance (a distance in the lateral direction) deltaY between side A and side B, and ends the lane change at time $t=T_4$.

Figure 2:
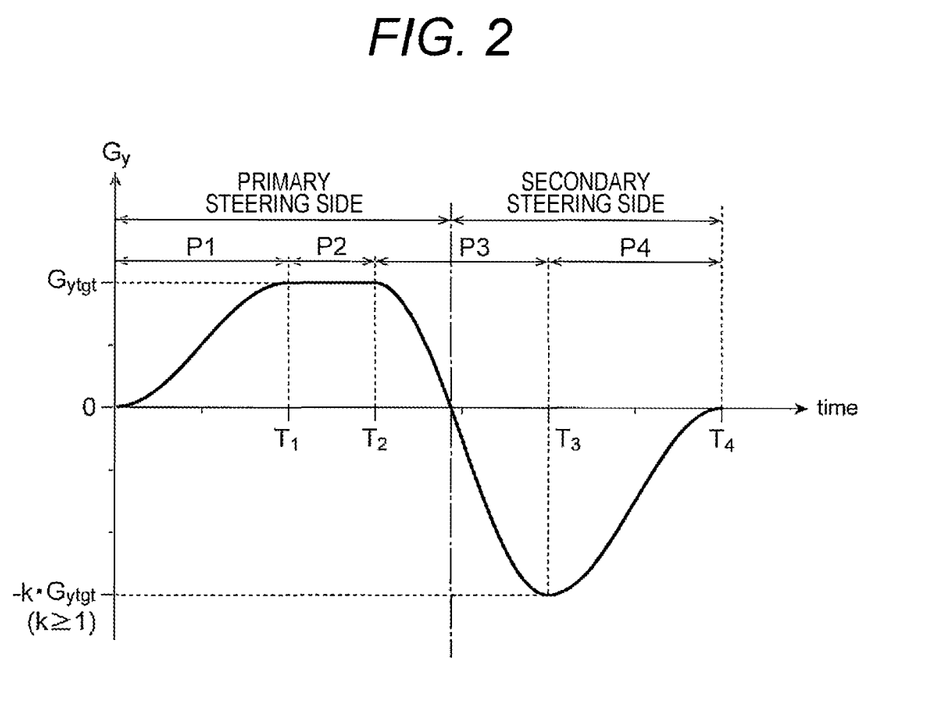
FIG. 2 is a diagram illustrating a lateral acceleration in lane change.

FIG. 2 is a conceptual diagram of lateral acceleration generated in the vehicle when lanes are changed.

In this description, the lane change is divided into the following four sections (P1 to P4), and the end times of the respective sections are $T_1$, $T_2$, $T_3$, and $T_4$.

P1: Turning start (steering start) section
P2: Holding section after turning
P3: Returning section
P4: Returning end (steering end) section Further, a lateral acceleration peak value (maximum value) generated at the time of turning is $G_{ytgt}$, and a lateral acceleration peak value (maximum value) generated at the time of returning is $-kG_{ytgt}$ obtained by multiplying $G_{ytgt}$ by the coefficient k and inverting the sign. Here, the lateral acceleration $G_y$ in P1 to P4 can be given by, for example, the following Equations (1) to (4).

[Math. 1]

$$G_y = \frac{G_{ytgt}}{2}(1 - \cos\omega_1 t) \quad (0 \leq t < T_1) \tag{1}$$

$$G_y = G_{ytgt} \quad (T_1 \leq t < T_2) \tag{2}$$

$$G_y = \frac{G_{ytgt}}{2}\{1 - k + (1+k)\cos\omega_3(t-T_2)\} \quad (T_2 \leq t < T_3) \tag{3}$$

$$G_y = -\frac{kG_{ytgt}}{2}\{1 + \cos\omega_4(t-T_3)\} \quad (T_3 \leq t < T_4) \tag{4}$$

At this time, if lateral movement speeds $V_y$ at t=0, $T_1$, $T_2$, $T_3$, $T_4$ are 0, $V_{y1}$, $V_{y2}$, $V_{y3}$, and $V_{y4}$ and lateral movement amounts Y are 0, $Y_1$, $Y_2$, $Y_3$, and $Y_4$, the lateral movement speed $V_y$ and the lateral movement amount Y in P1 to P4 are given by the following Equations (5) to (12), respectively.

[Math. 2]

$$V_y = \frac{G_{ytgt}}{2}\left(t - \frac{1}{\omega_1}\sin\omega_1 t\right) \quad (0 \leq t < T_1) \tag{5}$$

$$V_y = G_{ytgt} \cdot t + V_{y1} \quad (T_1 \leq t < T_2) \tag{6}$$

$$V_y = \frac{G_{ytgt}}{2}\left\{(1-k)(t-T_2) + \frac{1}{\omega_3}(1+k)\sin\omega_3(t-T_2)\right\} + V_{y2} \quad (T_2 \leq t < T_3) \tag{7}$$

$$V_y = -\frac{kG_{ytgt}}{2}\left\{(t-T_3) + \frac{1}{\omega_4}\sin\omega_4(t-T_3)\right\} + V_{y3} \quad (T_3 \leq t < T_4) \tag{8}$$

$$Y = \frac{G_{ytgt}}{2}\left(\frac{t^2}{2} + \frac{1}{\omega_1^2}\cos\omega_1 t\right) \quad (0 \leq t < T_1) \tag{9}$$

$$Y = \frac{1}{2}G_{ytgt} \cdot t^2 + V_{y1} \cdot t + Y_1 \quad (T_1 \leq t < T_2) \tag{10}$$

$$Y = \frac{G_{ytgt}}{2}\left\{\frac{1}{2}(1-k)(t-T_2)^2 - \frac{1}{\omega_3^2}(1+k)\cos\omega_3(t-T_2) + \frac{1}{\omega_3^2}(1+k)\right\} + V_{y2}\cdot(t-T_2) + Y_2 \quad (T_2 \leq t < T_3) \tag{11}$$

$$Y = -\frac{kG_{ytgt}}{2}\left\{\frac{(t-T_3)^2}{2} + \frac{1}{\omega_4^2} - \frac{1}{\omega_4^2}\cos\omega_4(t-T_3)\right\} + V_{y3}\cdot(t-T_3) + Y_3 \quad (T_3 \leq t < T_4) \tag{12}$$

Here, $V_{y1}$, $V_{y2}$, $V_{y3}$, $V_{y4}$, $Y_1$, $Y_2$, $Y_3$, and $Y_4$ are given by the following Equations (13) to (20), respectively.

[Math. 3]

$$V_{y1} = \frac{G_{ytgt}}{2} \cdot T_1 \tag{13}$$

$$V_{y2} = G_{ytgt} \cdot T_2 + \frac{G_{ytgt}}{2} \cdot T_1 \tag{14}$$

$$V_{y3} = \frac{G_{ytgt}}{2}\{(1-k)(T_3 - T_2)\} + G_{ytgt} \cdot T_2 + \frac{G_{ytgt}}{2} \cdot T_1 \tag{15}$$

$$V_{y4} = -\frac{kG_{ytgt}}{2}(T_4 - T_3) + \frac{G_{ytgt}}{2}\{(1-k)(T_3 - T_2)\} + G_{ytgt} \cdot T_2 + \frac{G_{ytgt}}{2} \cdot T_1 \tag{16}$$

$$Y_1 = \frac{G_{ytgt}}{2}\left(\frac{T_1^2}{2} - \frac{1}{\omega_1^2}\right) \tag{17}$$

-continued $$Y_2 = \frac{1}{2}G_{ytgt} \cdot T_2^2 + V_{y1} \cdot T_2 + \frac{G_{ytgt}}{2}\left(\frac{T_1^2}{2} - \frac{1}{\omega_1^2}\right) \quad (18)$$

$$Y_3 = \frac{G_{ytgt}}{2}\left\{-\frac{1}{2}(1-k)(T_3 - T_2)^2 + \frac{2}{\omega_3^2}(1+k)\right\} + V_{y2} \cdot (T_3 - T_2) + Y_2 \quad (19)$$

$$Y_4 = -\frac{kG_{ytgt}}{2}\left\{\frac{(T_4 - T_3)^2}{2} + \frac{2}{\omega_4^2}\right\} + V_{y3} \cdot (T_4 - T_3) + Y_3 \quad (20)$$

Here, assuming that the time from $T_1$ to $T_2$ is $\Delta T_2$, $T_1$, $T_2$, $T_3$, and $T_4$ are given by the following Equations (21) to (24) using $\omega_1$, $\Delta T_2$, $\omega_3$, and $\omega_4$.

[Math. 4]

$$T_1 = \frac{\pi}{\omega_1} \quad (21)$$

$$T_2 = \frac{\pi}{\omega_1} + \Delta T_2 \quad (22)$$

$$T_3 = \frac{\pi}{\omega_1} + \Delta T_2 + \frac{\pi}{\omega_3} \quad (23)$$

$$T_4 = \frac{\pi}{\omega_1} + \Delta T_2 + \frac{\pi}{\omega_3} + \frac{\pi}{\omega_4} \quad (24)$$

Assuming that the final target lateral movement distance of the lane change is $Y_{tgt}$, and that the lane change has been completed at $T_4$, $V_{y4}$ and $Y_4$ are given by the following Equations (25) and (26), respectively.

[Math. 5]

$$V_{y4} = 0 \quad (25)$$

$$Y_4 = Y_{tgt} \quad (26)$$

The following two Equations (27) and (28) are obtained from the relations of the above Equations (18) to (26).

[Math. 6]

$$-\frac{kG_{ytgt}}{2}(T_4 - T_3) + \quad (27)$$

$$\frac{G_{ytgt}}{2}\{(1-k)(T_3 - T_2)\} + G_{ytgt} \cdot T_2 + \frac{G_{ytgt}}{2} \cdot T_1 = 0$$

$$-\frac{kG_{ytgt}}{2}\left\{\frac{(T_4 - T_3)^2}{2} + \frac{2}{\omega_4^2}\right\} + V_{y3} \cdot (T_4 - T_3) + y_3 = Y_{tgt} \quad (28)$$

Assuming that a lateral acceleration peak value $G_{ytgt}$ and a target lateral movement distance $Y_{tgt}$ on a primary steering side (a phase in which the vehicle moves at the time of lane change, the lateral acceleration in the same direction as the lateral direction) are given in advance, the unknowns in the Equations (27) and (28) are as the following five. If three of these unknowns are set, the remaining two will be uniquely determined.

$\omega_1$: Determine the change in lateral acceleration at the time of turning start $\Delta T_2$: Determine a holding time from turning to returning $\omega_3$: Determine the change in lateral acceleration at the time of returning $\omega_4$: Determine a change in lateral acceleration until coming back to a straight running state after returning k: Determine a lateral acceleration peak at the time of returning For example, $\omega_1$, $\Delta T_2$, and $\omega_3$ are set as constants, and each constant is set so that k becomes 1 or more, and $\omega_4$ and k are calculated. Thereby, a target lateral acceleration $G_y$ in the lane change can be created. Further, $\Delta T_2$ may be determined based on the lateral movement amount of the vehicle.

Figure 3:
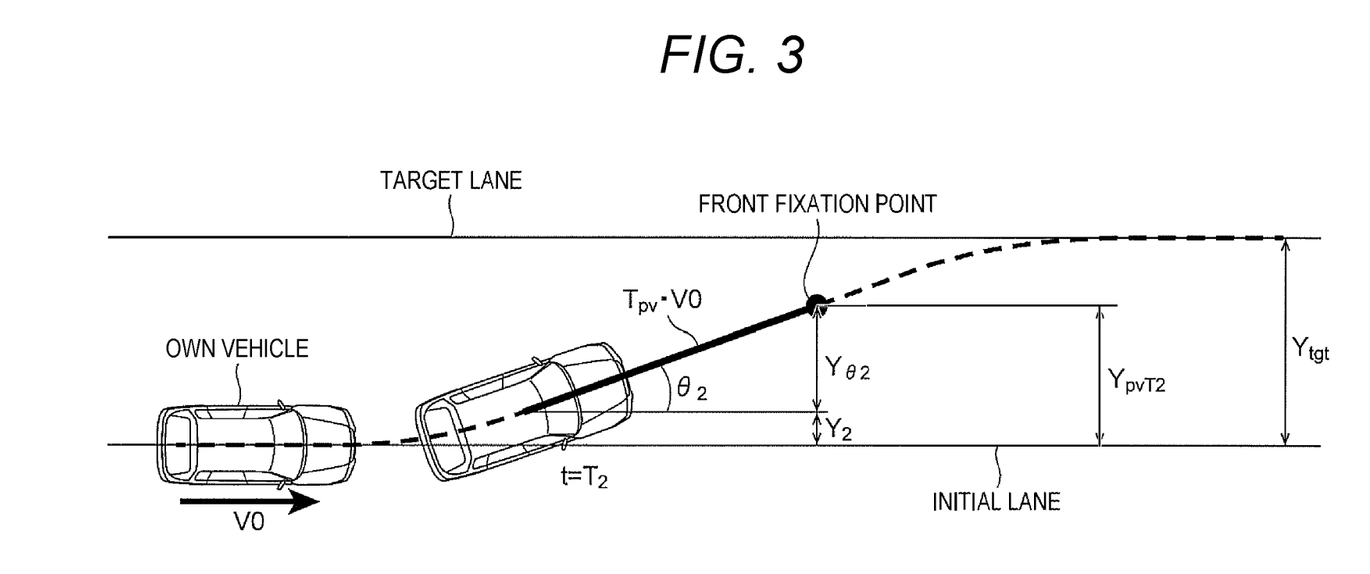
FIG. 3 is a diagram illustrating a relation between a forward fixation point and a vehicle position.

As illustrated in FIG. 3, using a preset forward fixation time $T_{pv}$, when the forward fixation point is set at a position of $L_{pv}$ ($=T_{pv} \cdot V0$) from the own vehicle, the distance $Y_{pvT2}$ from the forward fixation point and the initial lane at time $T_2$ is given by the following Equation (29) from the lateral movement amount $Y_2$ of the own vehicle at time $T_2$ and a movement distance $Y\theta_e$ based on a yaw angle $\theta_2$.

[Math. 7]

$$Y_{pvT2} = Y_2 + Y_{\theta 2} \quad (29)$$

Further, $Y\theta_e$ is given by the following Equation (30).

[Math. 8]

$$Y_{\theta 2} = V0 \cdot T_{pv} \cdot \theta_2 \quad (30)$$

Assuming that a value obtained by normalizing $Y_{pvT2}$ with the distance (target lateral movement amount $Y_{tgt}$) from the initial lane to the target lane is $NY_{pvT2}$, $NY_{pvT2}$ means which percentage the forward fixation point is located between the initial lane and the target lane. As a method of setting $\Delta T_2$, for example, considering the time until $Y_{pvT2}$ reaches a predetermined ratio (hereinafter $\alpha_{Ytgt}$) of the target lateral movement amount $Y_{tgt}$, instead of setting $\Delta T_2$ itself in advance, the predetermined ratio $\alpha_{Ytgt}$ of the target lateral movement amount $Y_{tgt}$ is set as the time until $Y_{pvT2}$ reaches the ratio. Therefore, even when the lane width (lane change width) changes, the lateral acceleration at the time of lane change can be set with a small constant setting.

Further, the description shows an example of a method of creating lateral acceleration control in the invention, and the lateral acceleration control of the invention is not limited only to this method.

By performing such acceleration (lateral acceleration, or longitudinal acceleration and lateral acceleration) control, it is possible to suppress the occurrence of unstable behavior of the vehicle at the time of lane change by the automatic driving control, thereby improving the comfort of the occupants.

First Embodiment

Hereinafter, the configuration and operation of the vehicle motion control device according to a first embodiment of the invention will be described with reference to FIGS. 4 to 6.

First, a vehicle equipped with the vehicle motion control device according to the first embodiment of the invention and a configuration of the vehicle motion control device will be described with reference to FIG. 4.

Figure 4:
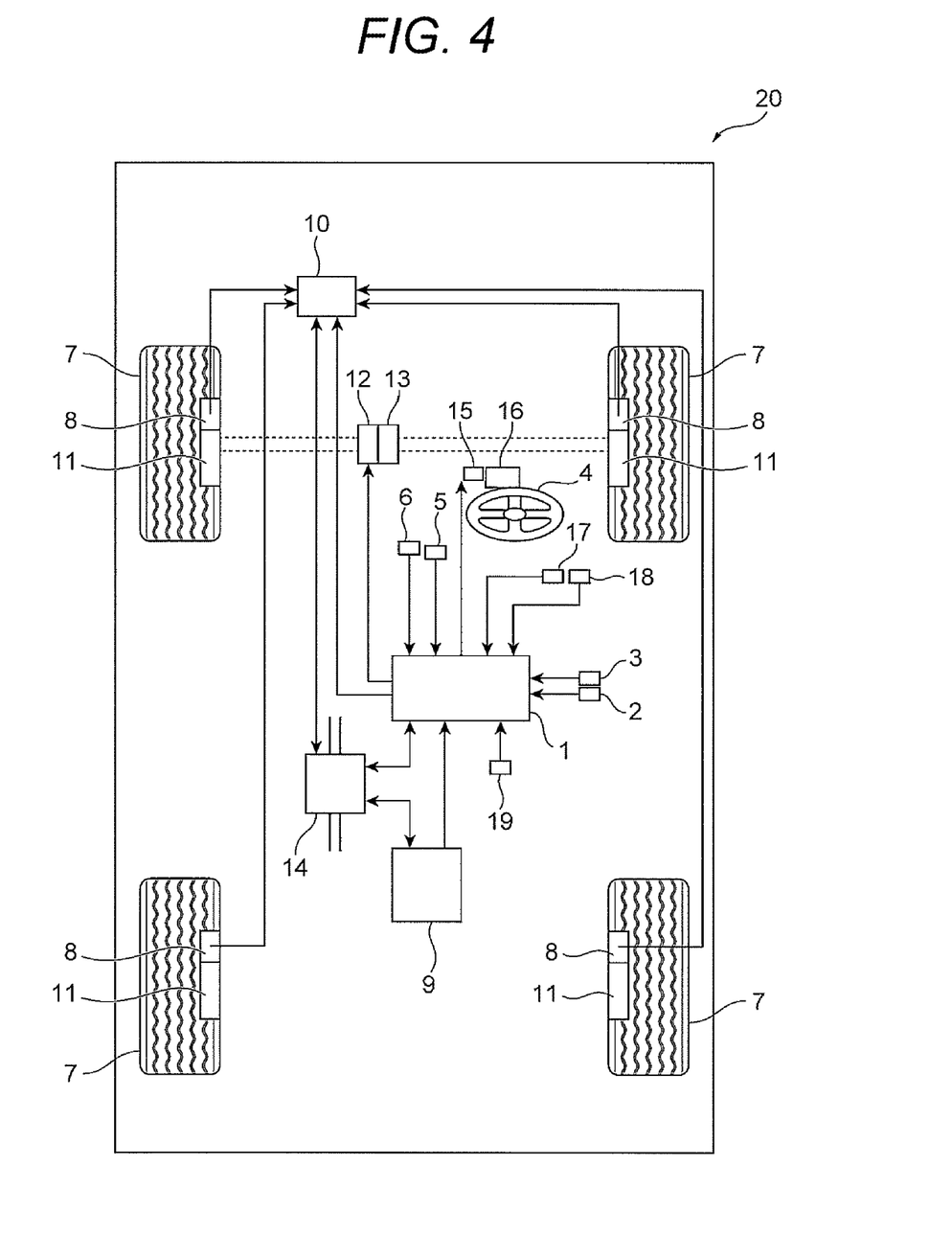
FIG. 4 is a conceptual diagram illustrating a configuration of a vehicle mounted with a first embodiment of a vehicle motion control device according to the invention.

FIG. 4 illustrates a configuration diagram of a vehicle equipped with the vehicle motion control device according to the first embodiment of the invention.

The vehicle motion control device 1 of this embodiment is mounted on a vehicle 20, and performs calculation required for the acceleration control based on various types of information obtained from sensors (an acceleration sensor 2, a gyro sensor 3, a wheel speed sensor 8) for acquiring vehicle motion state information, and sensors (a steering angle sensor 5, a brake pedal sensor 17, an accelerator pedal sensor 18) for acquiring driver operation information, and sensors (a course shape acquisition sensor 6, an own vehicle position detection sensor 9, an external information detection sensor 19) for acquiring own vehicle traveling road information. Based on the calculation results, a control command value is transmitted to control units (a brake control unit 10, a drive torque control unit 12, a steering angle control unit 15) which control driving of actuators (a brake actuator 11, a drive actuator 13, and a steering angle control actuator 16) capable of control the longitudinal acceleration generated in the vehicle and/or the lateral acceleration, via a communication line 14.

Here, the sensor for acquiring the vehicle motion state information may be any sensor or devices capable of acquiring a vehicle speed, a longitudinal acceleration, a lateral acceleration, and a yaw rate, and is not limited to the above sensor configuration. For example, the vehicle speed may be acquired by differentiating the position information obtained by the global positioning system (GPS). In addition, the yaw rate, the longitudinal acceleration, and the lateral acceleration of the vehicle may be acquired using an image acquisition sensor such as a camera. Further, the vehicle motion control device 1 may not need to have a direct sensor input. For example, the necessary information may be acquired through the communication line 14 from a separate unit (for example, the brake control unit 10).

As a sensor for acquiring driver operation information, it is only necessary to be able to acquire an operation amount of a steering wheel 4 and an operation amount of a brake pedal and an accelerator pedal (not illustrated) by the driver. The vehicle motion control device 1 may not have to wait the direct input from the sensor similarly to the acquisition of the vehicle motion state information described above. For example, the necessary information may be acquired through the communication line 14 from a separate unit (for example, the brake control unit 10).

A global positioning system (GPS) is used as a sensor to acquire the own vehicle traveling road information as the own vehicle position detection sensor 9, and the external information detection sensor 19 is used as a sensor to detect obstacles around the own vehicle, such as cameras and radars so as to detect a travelable region, and a course shape acquisition sensor 6 is used as a sensor to acquire the traveling route information of the own vehicle, such as a navigation system. Here, the sensor for acquiring the own vehicle traveling road information may be any device as long as it can acquire the course shape and the travelable region in the traveling direction of the own vehicle, and is not limited to these sensors. For example, a method of acquiring the course shape in front of the own vehicle by communication with a data center or a device that transmits road information installed on the road may be employed, or a method of acquiring an image in front of or around the own vehicle by an imaging device such as a camera, or both images to acquire the course shape in front of the own vehicle. Further, there may be employed a method of acquiring the course shape from a unit, which calculates the course shape in the traveling direction of the own vehicle, through the communication line 14 by any of these devices or a combination thereof may be employed.

An acceleration/deceleration actuator (the brake actuator 11, the drive actuator 13) capable of controlling the longitudinal acceleration generated in the vehicle 20 is an actuator which can control the longitudinal acceleration generated in the vehicle 20 by controlling a force generated between a tire 7 and the road surface. For example, there may be employed an acceleration/deceleration actuator which can control the longitudinal acceleration such as a combustion engine which can control braking/driving torque applied on the tire 7 by controlling a combustion state and can control the longitudinal acceleration of the vehicle 20, an electric motor which can control the braking/driving torque applied on the tire 7 by controlling a current and control the longitudinal acceleration of the vehicle 20, a transmission which can control the longitudinal acceleration of the vehicle 20 by changing a gear ratio when power is transmitted to each front wheel, or a friction brake which generates the longitudinal acceleration to the vehicle 20 by pressing a brake disk to a brake pad of each front wheel.

Further, the vehicle motion control device 1 is provided with an arithmetic device which has a memory region, an arithmetic processing capability, and signal input/output units. The vehicle motion control device calculates a longitudinal acceleration command value to be generated in the vehicle 20 from various types of information obtained from the vehicle motion state information, the driver operation information, and the own vehicle traveling road information, and transmits the longitudinal acceleration command value to a drive controller (the brake control unit 10, and the drive torque control unit 12) of the acceleration/deceleration actuator (the brake actuator 11, and the drive actuator 13) using the acceleration/deceleration actuator capable of generating the longitudinal acceleration serving as the longitudinal acceleration command value as a longitudinal acceleration generation unit. Further, a lateral motion command to be generated in the vehicle 20 is calculated from various types of information obtained from the vehicle motion state information, the driver operation information, and the own vehicle traveling road information. A steering command value as the lateral motion command value is sent to the drive controller (the steering angle control unit 15) of the steering angle control actuator 16 using the steering angle control actuator 16 as a turning motion generating unit which can generate the lateral motion (details will be described later).

Here, the signal sent from the vehicle motion control device 1 is not the longitudinal acceleration itself, but may be any signal that can realize the longitudinal acceleration command value by the acceleration/deceleration actuator. Similarly, the signal sent from the vehicle motion control device 1 is not the steering angle itself, but may be any signal that can realize the steering angle command value by the steering angle control actuator 16.

For example, in a case where the acceleration/deceleration actuator is a combustion engine, a braking/driving torque command value which can realize the longitudinal acceleration command value may be sent to the drive torque control unit 12. A driving signal of the combustion engine realizing the longitudinal acceleration command value may be directly transmitted to the control actuator of the combustion engine without through the drive torque control unit 12. In a case where a hydraulic friction brake which hydraulically attaches the brake pad to the brake disk is used, a hydraulic command value realizing the longitudinal acceleration command value is sent to the brake control unit 10. The driving signal of the driving actuator of the hydraulic friction brake realizing the longitudinal acceleration command value may be directly sent to the driving actuator of the hydraulic friction brake without through the brake control unit 10.

When the longitudinal acceleration command value is realized, the acceleration/deceleration actuator which performs the driving control may be changed according to the longitudinal acceleration command value.

For example, in a case where the combustion engine and the hydraulic friction brake are provided as the acceleration/deceleration actuator, the combustion engine is controlled in driving if the longitudinal acceleration command value falls within a range which can be realized by controlling the braking/driving torque of the combustion engine, and the hydraulic friction brake is controlled in driving together with the combustion engine in a case where the longitudinal acceleration command value is a negative value within a range which cannot be realized by controlling the braking/driving torque of the combustion engine. Further, when the electric motor and the combustion engine are provided as the acceleration/deceleration actuator, the electric motor is drive-controlled when the temporal change in the longitudinal acceleration is large, and the combustion engine is drive-controlled when the temporal change in the longitudinal acceleration is small. In normal time, the longitudinal acceleration command value may be controlled in driving by the electric motor. When the electric motor is not able to realize the longitudinal acceleration command due to the state of the battery, another acceleration/deceleration actuator (the combustion engine, the hydraulic friction brake, etc.) may be controlled in driving.

Further, as the communication line 14, a communication line and a communication protocol which differ depending on a signal may be used. For example, the ethernet may be used for the communication with a sensor acquiring the own vehicle traveling road information which necessarily transfers a large amount of data. Controller Area Network (CAN) may be used when the communication is performed with the actuator.

Figure 5:
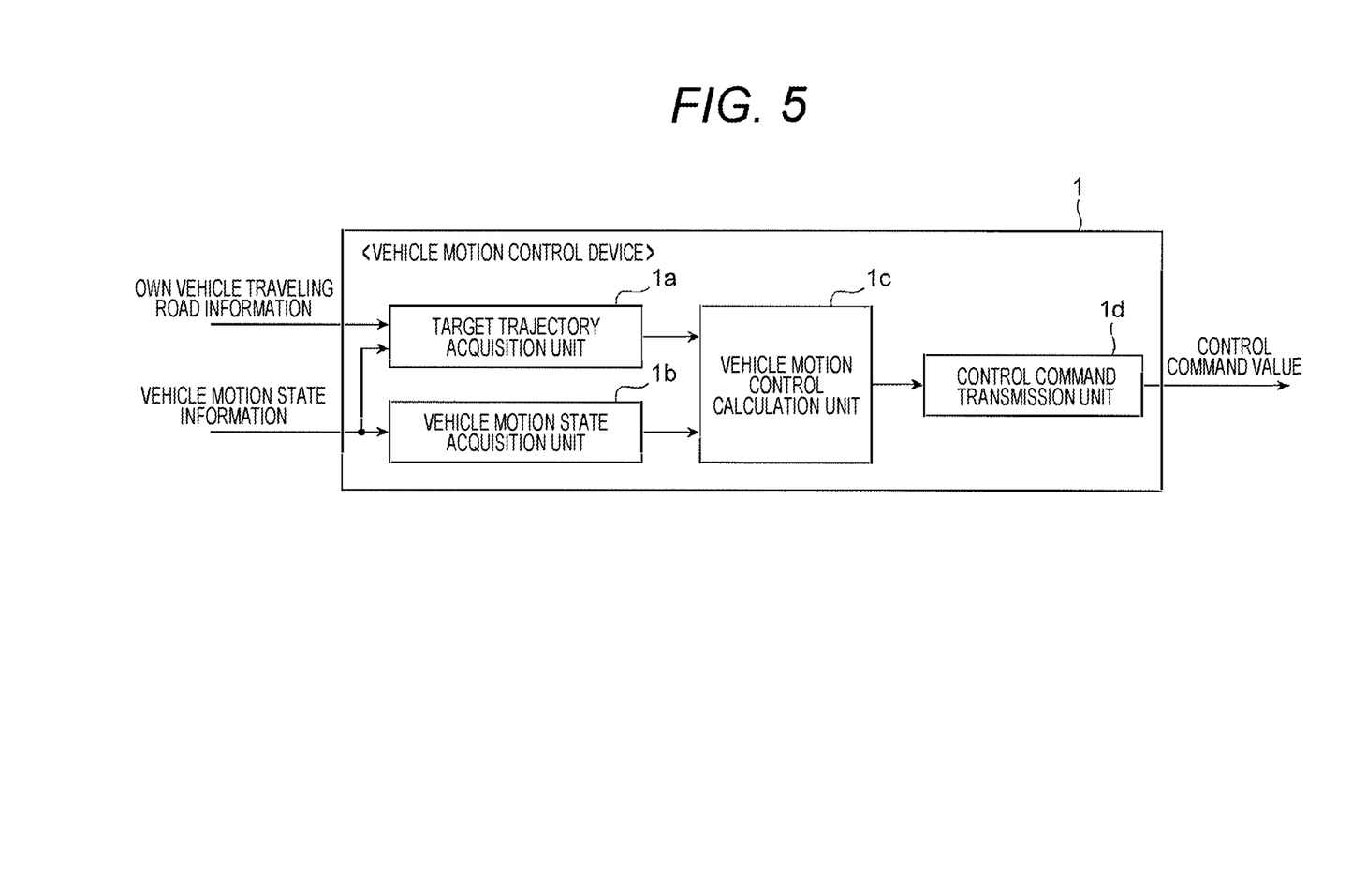
FIG. 5 is a configuration diagram of the first embodiment of the vehicle motion control device according to the invention.

FIG. 5 illustrates a configuration diagram of the vehicle motion control device 1 according to the first embodiment of the invention.

As illustrated in the drawing, the vehicle motion control device 1 includes a target trajectory acquisition unit 1a, a vehicle motion state acquisition unit 1b, a vehicle motion control calculation unit 1c, and a control command transmission unit 1d.

The target trajectory acquisition unit 1a acquires a target trajectory and a travelable region to be generated in the vehicle 20 to travel based on the own vehicle traveling road information and the vehicle motion state information. Here, the method of creating the target trajectory may be a method of creating a target trajectory from the course shape in which the own vehicle travels and obstacle information, or a method of creating the target trajectory based on the travelable region acquired by the own vehicle through communication with the data center.

The vehicle motion state acquisition unit 1b acquires a motion state amount (traveling speed, turning state, and driver operation amount) of the vehicle 20 from the vehicle motion state information.

The vehicle motion control calculation unit 1c calculates the longitudinal acceleration command value by the speed control, or both the longitudinal acceleration command value by the speed control and the steering angle command value by the steering angle control based on the information obtained by the target trajectory acquisition unit 1a and the vehicle motion state acquisition unit 1b, and sends the calculation result to the control command transmission unit 1d.

The control command transmission unit 1d sends a control command value to each control unit (the brake control unit 10, the drive torque control unit 12, and the steering angle control unit 15) which performs the driving control of the actuator (the brake actuator 11, the drive actuator 13, and the steering angle control actuator 16) which can control the longitudinal acceleration and/or actual steering angle of the tire, based on the longitudinal acceleration command value created by the vehicle motion control calculation unit 1c or both the longitudinal acceleration command value and the steering command value.

Figure 6:
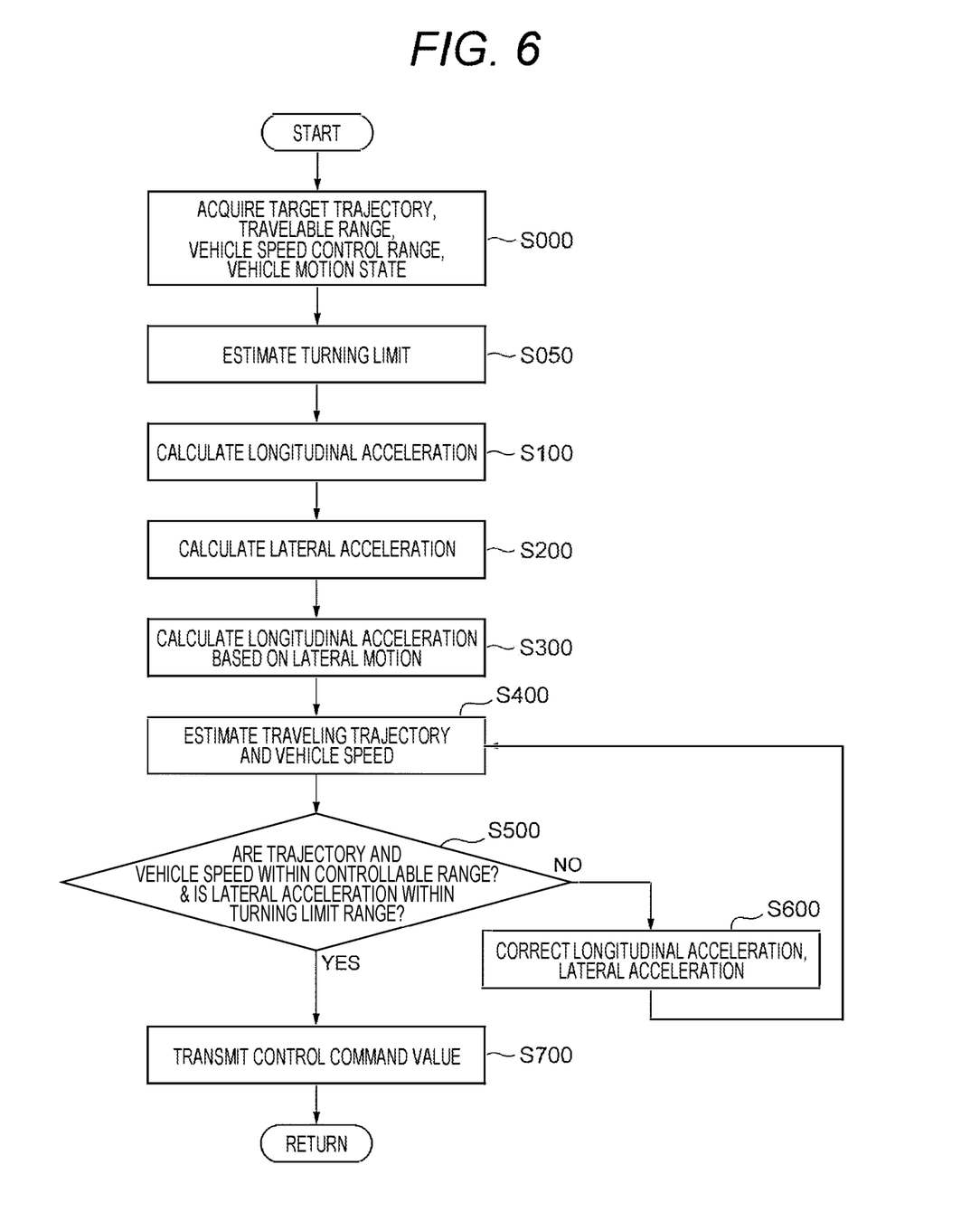
FIG. 6 is a control flowchart of the first embodiment of the vehicle motion control device according to the invention.

FIG. 6 illustrates a control flowchart in the vehicle motion control device 1 of the first embodiment.

In S000, a target trajectory, a travelable range, a vehicle speed control range, and a vehicle motion state are acquired as described above. Here, as illustrated in FIGS. 1 and 2, the target trajectory may be acquired by a method of providing a lane changeable region (deltaX, deltaY), a vehicle speed control range, and a target lateral movement distance $Y_{tgt}$, or a method of providing a target lateral position at a predetermined proceeding distance position.

In S050, a turning limit of the vehicle 20 is estimated from the vehicle motion state during a primary steering period. For example, if a turning responsiveness of the vehicle (on the traveling road surface) to the steering input at the start of the lane change is worse than the responsiveness under preset conditions (for example, the response to the same input on a dry road surface), the turning limit is set low according to the degree of decrease in responsiveness.

In S100, the longitudinal acceleration is calculated from the target trajectory, the vehicle speed control range, and the vehicle motion state. For example, when the vehicle speed is higher than the vehicle speed control range, a negative longitudinal acceleration command value is calculated so as to be within the vehicle speed control range.

In S200, the lateral acceleration is calculated from the target trajectory, the vehicle motion state, and the turning limit. The calculation of the lateral acceleration is performed, for example, by the method illustrated in FIGS. 1 to 3. Specifically, the lateral acceleration is calculated (controlled) such that the maximum lateral acceleration (absolute value) generated on the secondary steering side (lateral acceleration generation phase in the lateral direction opposite to the moving direction at the time of lane change) is equal or more than the maximum lateral acceleration (absolute value) generated on the primary steering side (lateral acceleration generation phase in the same direction as a lateral moving direction at the time of lane change). Here, for example, assuming that the lane width (lane change width) is the same, the time during which the generated lateral acceleration is constant during the primary steering period (P2 in FIG. 2: holding section after turning) becomes shorter as the generated lateral acceleration increases. However, the relation between the time at which the generated lateral acceleration is constant and the generated lateral acceleration changes according to the lane width (lane change width).

Here, in addition to $G_{tgt}$, the initial value of the setting constant may be a value that is set in advance, or may be a value that is changed according to the occupant's preference.

In S300, the longitudinal acceleration based on the lateral motion is calculated. As a method of calculating the longitudinal acceleration based on the lateral motion, for example, longitudinal acceleration control based on a lateral acceleration increasing rate disclosed in PTL 3 is exemplified.

In S400, the traveling trajectory and vehicle speed of the vehicle 20 are estimated based on the vehicle motion state, the calculated lateral acceleration, and the longitudinal acceleration. For example, in this lane change (lateral motion) control section, particularly, a section in which the lateral acceleration (absolute value) generated at the time of the secondary steering after the steering at the time of lane change starts is maximized (peak) (P3 of FIG. 2: section up to the returning section), the vehicle speed is estimated such that the vehicle speed is constant or decreases.

In S500, it is determined whether the estimated traveling trajectory and vehicle speed are within a controllable range, and whether the lateral acceleration is within a turning limit range. Here, if it is determined to be outside the control range, the process proceeds to S600, and if it is determined to be within the control range, the process proceeds to S700.

In S600, the longitudinal acceleration and the lateral acceleration are corrected. For example, in the correction of the lateral acceleration, the traveling trajectory is changed in S400 by changing various setting variables illustrated in Equations (1) to (28). Also, the traveling trajectory and the vehicle speed are changed in S400 by changing a control gain of the longitudinal acceleration control based on the lateral acceleration increasing rate disclosed in PTL 3. Thereafter, again in S500, it is determined whether the traveling trajectory and the vehicle speed are within a controllable range, and whether the lateral acceleration is within a turning limit range. Here, the setting constants are set so that the maximum lateral acceleration (absolute value) on the secondary steering side is equal to or greater than the maximum lateral acceleration (absolute value) on the primary steering side and within the turning limit range. However, it is desirable that the maximum lateral acceleration (absolute value) on the secondary steering side be set to a value to twice or less than the maximum lateral acceleration (absolute value) on the primary steering side so that the lateral acceleration difference between the steering side and the secondary steering side does not become excessive and the ride comfort of the occupant does not deteriorate.

In S700, a control command value for each actuator is calculated and transmitted based on the longitudinal acceleration command value and the lateral acceleration command value. For example, when controlling the longitudinal acceleration using a combustion engine and controlling a yaw moment (lateral acceleration) using an electric power steering, a braking/driving torque command value for causing the vehicle to generate the longitudinal acceleration is sent to the controller of the combustion engine. The steering angle command value for causing the vehicle to generate the lateral acceleration is sent to the controller of the electric power steering.

Here, the method of creating the steering angle command value based on the lateral acceleration command value has been described, but a method of directly creating the steering angle command value from the vehicle speed and the lateral movement amount at the time of lane change may be used. For example, there may be employed a method of controlling the steering angle of the vehicle 20 such that the maximum steering angle absolute value on the secondary steering side is equal to or greater than the maximum steering angle absolute value on the primary steering side using a map of the relation between the vehicle speed and the lateral movement amount created in advance.

As described above, in the first embodiment, the turning limit is estimated based on the turning responsiveness of the vehicle 20 during the primary steering (the lane change start side) while the lateral acceleration generated on the primary steering side is suppressed. By generating the lateral acceleration on the secondary steering side within the turning limit range, it is possible to change lanes without excessively suppressing the lateral acceleration while disturbance of the vehicle behavior on the primary steering side is suppressed. In addition, on the secondary steering side, the occupant is in a state under the occurrence of lateral acceleration, and even if the lateral acceleration on the secondary steering side has a slightly larger value than the primary steering side that transits from straight running state to lateral motion, it is considered that the comfort of the occupant is not significantly impaired.

Second Embodiment

Next, the configuration and operation of a vehicle motion control device (target trajectory generation device) according to a second embodiment of the invention will be described using FIG. 7.

Figure 7:
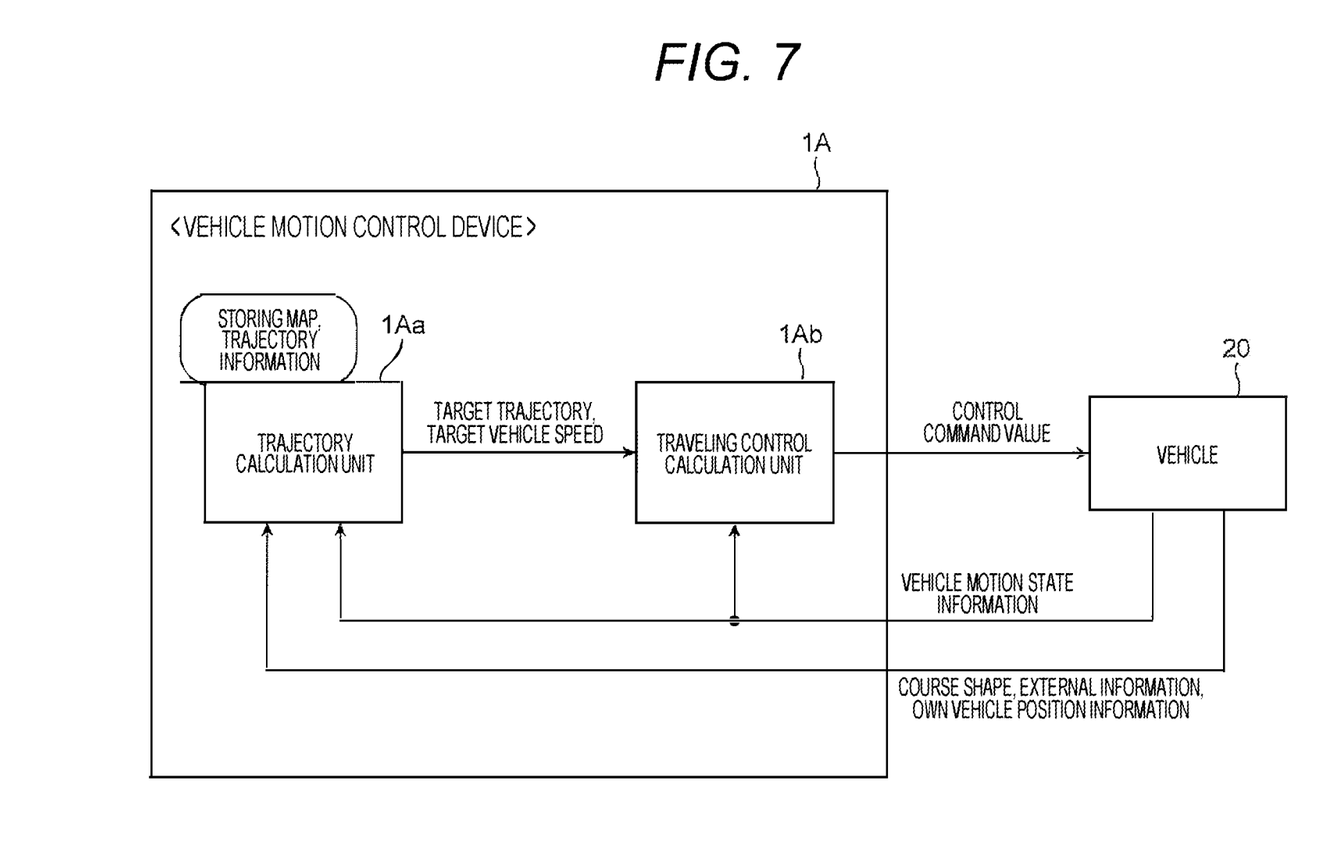
FIG. 7 is a configuration diagram of a vehicle motion control device according to a second embodiment of the invention.

FIG. 7 illustrates a configuration diagram of a vehicle motion control device (target trajectory generation device) 1A according to the second embodiment of the invention. In the example illustrated in FIG. 7, the vehicle motion control device (target trajectory generation device) 1A is provided outside the vehicle 20, but may be provided in the vehicle 20 as in the first embodiment.

In this embodiment, the vehicle motion control device 1A includes a plurality of arithmetic devices having a memory region, an arithmetic processing capability, a signal input/output unit, and the like, and mainly includes a trajectory calculation unit 1Aa and a travel control calculation unit 1Ab.

The trajectory calculation unit 1Aa creates a target trajectory and a target vehicle speed of the vehicle 20 from the course shape, the external information, the own vehicle position information, and the vehicle motion state information.

The travel control calculation unit 1Ab calculates a lateral motion command value to be generated in the vehicle or both a lateral motion command value and a longitudinal acceleration command value from the target trajectory, the target vehicle speed, and the vehicle motion state information. The longitudinal acceleration command value is sent to a drive controller (the brake control unit 10, and the drive torque control unit 12) for the acceleration/deceleration actuator (the brake actuator 11, and the drive actuator 13), using the acceleration/deceleration actuator capable of generating a longitudinal acceleration serving as the longitudinal acceleration command value as a longitudinal acceleration generation unit. The steering angle control actuator 16 which can generate the lateral motion command value to be generated in the vehicle 20 is used as a turning motion generating unit, and sends the steering command value as the lateral motion command value to the drive controller (the steering angle control unit 15) of the steering angle control actuator 16.

Specifically, when generating a target trajectory and a target vehicle speed from the course shape, the external information, the own vehicle position information, and the vehicle motion state information, the trajectory calculation unit 1Aa generates the target trajectory and the target vehicle speed such that the absolute value of the maximum lateral acceleration generated in the vehicle on the secondary steering side becomes equal to or greater than the absolute value of the maximum lateral acceleration generated in the vehicle 20 on the primary steering side (see FIG. 2). Here, for example, if the target vehicle speed is substantially constant, the target trajectory at the time of lane change is created such that the maximum curvature value of the target trajectory (traveling trajectory) on the secondary steering side is equal to or greater than the maximum curvature value of the target trajectory (traveling trajectory) on the primary steering side (in other words, the maximum curvature value of the traveling trajectory on the secondary steering side becomes equal to or greater than the maximum curvature value of the traveling trajectory on the primary steering side).

As described above, the travel control calculation unit 1Ab calculates a lateral motion command value to be generated in the vehicle 20 or both a lateral motion command value and a longitudinal acceleration command value to realize the target trajectory and the target vehicle speed created by the trajectory calculation unit 1Aa. The longitudinal acceleration command value is sent to a drive controller (the brake control unit 10, and the drive torque control unit 12) for the acceleration/deceleration actuator (the brake actuator 11, and the drive actuator 13), using the acceleration/deceleration actuator capable of generating a longitudinal acceleration serving as the longitudinal acceleration command value as a longitudinal acceleration generation unit. The steering angle control actuator 16 which can generate the lateral motion command value to be generated in the vehicle 20 is used as a turning motion generating unit, and sends the steering command value as the lateral motion command value to the drive controller (the steering angle control unit 15) of the steering angle control actuator 16.

As described above, in the second embodiment, when the vehicle motion control device (target trajectory generation device) 1A generates the target trajectory, the target trajectory and the target vehicle speed are created such that the absolute value of the maximum lateral acceleration generated in the vehicle 20 on the secondary steering side becomes equal to or greater than the absolute value of the maximum lateral acceleration generated in the vehicle 20 on the primary steering side. Therefore, the vehicle can travel within the travelable range, and the lateral acceleration generated in the vehicle 20 can be controlled such that the absolute value of the maximum lateral acceleration generated in the vehicle 20 on the secondary steering side becomes equal to or greater than the absolute value of the maximum lateral acceleration generated in the vehicle 20 on the primary steering side. Therefore, the same effect as that of the first embodiment can be obtained, the calculation load on the travel control calculation unit 1Ab can be reduced, and it is possible to realize control in which the trajectory calculation device (the trajectory calculation unit 1Aa) is combined with another travel control calculation device (the travel control calculation unit 1Ab).

Further, the invention is not limited to the above embodiments, but various modifications may be contained. For example, the above-described embodiments of the invention have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

Each of the above configurations, functions, processing units, processing means, and the like may be partially or entirely achieved by hardware by, for example, designing an integrated circuit. Each of the above configurations, functions, and the like may be achieved by software by a processor interpreting and executing a program that achieves each function. Information such as a program, a table, and a file for achieving each function can be stored in a memory device such as a memory, a hard disk, or a solid-state drive (SSD), or a recording medium such as an integrated circuit (IC) card, a secure digital (SD) card, or a digital versatile disc (DVD).

In addition, only control lines and information lines considered to be necessary for explanation are illustrated, but not all the control lines and the information lines for a product are illustrated. In practice, almost all the configurations may be considered to be connected to each other.

REFERENCE SIGNS LIST 1 vehicle motion control device (first embodiment)
1A vehicle motion control device (target trajectory generation device) (second embodiment)
1a target trajectory acquisition unit
1b vehicle motion state acquisition unit
1c vehicle motion control calculation unit
1d control command transmission unit
2 acceleration sensor
3 gyro sensor
4 steering wheel
5 steering angle sensor
6 course shape acquisition sensor
7 tire
8 wheel speed sensor
9 own vehicle position detection sensor
10 braking control unit
11 braking actuator
12 drive torque control unit
13 driving actuator
14 communication line
15 steering angle control unit
16 steering angle control actuator
17 brake pedal sensor
18 accelerator pedal sensor
19 external information detection sensor
20 vehicle

The invention claimed is:

1. An apparatus which automatically controls a lateral acceleration generated in a vehicle at a time of lane change, comprising:
a controller that is configured to control a lateral motion of the vehicle, such that an absolute value of a maximum lateral acceleration generated at a time of a secondary steering side of lane change becomes equal to or greater than an absolute value of a maximum lateral acceleration generated at a time of a primary steering side of lane change, wherein
the primary steering side of lane change is a phase in which the lateral acceleration is generated in the same direction as a lateral moving direction at the time of lane change, and
the secondary side of lane change is when a phase in which the lateral acceleration is generated in a direction opposite to the lateral moving direction at the time of lane change.

2. The apparatus according to claim 1, wherein the amount of time during which the generated lateral acceleration of the primary steering side is constant is decreased when the generated lateral acceleration increases.

3. The apparatus according to claim 1, wherein the absolute value of the maximum lateral acceleration generated during the secondary steering side of lane change is equal to or less than twice as large as the absolute value of the maximum lateral acceleration generated during the primary steering side of lane change.

4. The apparatus according to claim 1, wherein
in a section in which the absolute value of the lateral acceleration generated during the secondary steering side of lane change after steering at the time of lane change starts is maximized, the lateral motion of the vehicle is controlled by the controller so that a speed of the vehicle is constant or decreases.

5. The apparatus according to claim 1, wherein
during the primary steering side of lane change, a turning limit of the vehicle on a traveling road surface is estimated.

6. An apparatus which automatically controls a lateral acceleration generated in a vehicle at a time of lane change, comprising:
a controller that is configured to control a steering of the vehicle, such that an absolute value of a maximum steering angle generated at a time of a secondary steering side of lane change becomes equal to or greater than an absolute value of a maximum steering angle generated at a time of a primary steering side of lane change, wherein
the primary steering side of lane change is a phase in which the lateral acceleration is generated in the same direction as a lateral moving direction at the time of lane change, and
the secondary steering side of lane change is a phase in which the lateral acceleration is generated in a direction opposite to the lateral moving direction at the time of lane change.

7. An apparatus which can automatically controls a lateral acceleration generated in a vehicle at a time of lane change, comprising:
a controller that is configured to control a traveling trajectory of the vehicle, such that a speed of the vehicle is constant and a maximum curvature value of the traveling trajectory during a secondary steering side of lane change becomes equal to or greater than a maximum curvature value of a traveling trajectory during a primary steering side of lane change, wherein
the primary steering side of lane change is a phase in which the lateral acceleration is generated in the same direction as a lateral moving direction at the time of lane change, and
the secondary steering side of lane change is a phase in which the lateral acceleration is generated in a direction opposite to the lateral moving direction at the time of lane changes.

8. A vehicle motion control method, comprising
automatically controlling a lateral acceleration generated in a vehicle at a time of lane change, and
controlling a lateral motion of the vehicle using a vehicle motion controller such that an absolute value of a maximum lateral acceleration generated at a time of a secondary steering of lane change becomes equal to or greater than an absolute value of a maximum lateral acceleration generated at a time of a primary steering of lane change, wherein
the primary steering side of lane change is a phase in which the lateral acceleration is generated in the same direction as a lateral moving direction at the time of lane change, and the secondary steering side of lane change is a phase in which the lateral acceleration is generated in a direction opposite to the lateral moving direction at the time of lane change.

9. A vehicle motion control system, comprising:
a vehicle motion control calculation unit that automatically controls a lateral acceleration generated in a vehicle at a time of lane change;
a target trajectory acquisition unit that acquires a target trajectory for the vehicle to travel; and
a vehicle motion state acquisition unit that acquires a motion state of the vehicle,
wherein
a lateral motion of the vehicle is controlled by the vehicle motion control calculation unit such that an absolute value of a maximum lateral acceleration generated at the time of a secondary steering of lane change becomes equal to or greater than an absolute value of a maximum lateral acceleration generated at the time of a primary steering of lane change, wherein
the primary steering side of lane change is a phase in which the lateral acceleration is generated in the same direction as a lateral moving direction at the time of lane change, and
the secondary steering side of lane change is a phase in which the lateral acceleration is generated in a direction opposite to the lateral moving direction at the time of lane change.

10. An apparatus that automatically controls a lateral acceleration generated in a vehicle at a time of lane change, comprising:
a controller that is configured to generate a target trajectory, such that an absolute value of a maximum lateral acceleration generated at the time of a secondary steering of lane change becomes equal to or greater than an absolute value of a maximum lateral acceleration generated at the time of a primary steering of lane change, wherein
the primary steering side of lane change is a phase in which the lateral acceleration is generated in the same direction as a lateral moving direction at the time of lane change, and
the secondary steering side of lane change is a phase in which the lateral acceleration is generated in a direction opposite to the lateral moving direction at the time of lane change.

11. The apparatus according to claim 10, wherein
the speed of the vehicle is constant, and
a target trajectory is generated by the controller so that a maximum curvature value of a traveling trajectory during a secondary steering side of lane change becomes equal to or greater than a maximum curvature value of a traveling trajectory during a primary steering side of lane change.

12. A target trajectory generation method, comprising:
automatically controlling a lateral acceleration generated in a vehicle at the time of lane change; and
generating a target trajectory using a target trajectory generation controller such that an absolute value of a maximum lateral acceleration generated at the time of a secondary steering side of lane change becomes equal to or greater than an absolute value of a maximum lateral acceleration generated at the time of a primary steering side of lane change, wherein the primary steering side of lane change is a phase in which the lateral acceleration is generated in the same direction as a lateral moving direction at the time of lane change, and the secondary steering side of lane change is a phase in which the lateral acceleration is generated in a direction opposite to the lateral moving direction at the time of lane change.

13. A target trajectory generation system, comprising:

a trajectory calculation unit that creates a target trajectory for a vehicle to travel at the time of lane change; and a travel control calculation unit that automatically controls a lateral acceleration generated in the vehicle, and the target trajectory is generated by the trajectory calculation unit such that an absolute value of a maximum lateral acceleration generated at the time of a secondary steering of lane change becomes equal to or greater than an absolute value of, a maximum lateral acceleration generated at the time of a primary steering of lane change wherein, the primary steering side of lane change is a phase in which the lateral acceleration is generated in the same direction as a lateral moving direction at the time of lane change, and a secondary steering side of lane change is a phase in which the lateral acceleration is generated in a direction opposite to the lateral moving direction at the time of lane change.

* * * * *